United States Patent
Ramankutty et al.

(10) Patent No.: US 8,200,830 B2
(45) Date of Patent: Jun. 12, 2012

(54) DETECTING OVERLOADS IN NETWORK DEVICES

(75) Inventors: Rajesh Ramankutty, Nashua, NH (US); Kuntal Chowdhury, Andover, MA (US); Andrew Gibbs, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/717,668

(22) Filed: Mar. 4, 2010

(65) Prior Publication Data

US 2010/0281157 A1 Nov. 4, 2010

Related U.S. Application Data

(60) Provisional application No. 61/157,474, filed on Mar. 4, 2009.

(51) Int. Cl.
*G06F 15/16* (2006.01)
(52) U.S. Cl. ........ 709/227; 709/206; 709/224; 709/225; 709/226; 709/228; 709/235; 709/238
(58) Field of Classification Search .................. 709/206, 709/224, 225, 226, 227, 228, 235, 238
See application file for complete search history.

(56) References Cited

U.S. PATENT DOCUMENTS

| | | | | |
|---|---|---|---|---|
| 2004/0258239 | A1* | 12/2004 | Gallant et al. | 379/900 |
| 2006/0099930 | A1* | 5/2006 | Cormier et al. | 455/412.1 |
| 2006/0268685 | A1* | 11/2006 | Bender et al. | 370/216 |
| 2007/0036079 | A1 | 2/2007 | Chowdury et al. | |
| 2007/0253328 | A1 | 11/2007 | Harper et al. | |
| 2008/0250156 | A1* | 10/2008 | Agarwal et al. | 709/235 |
| 2009/0016334 | A1* | 1/2009 | Forsberg et al. | 370/389 |
| 2010/0272115 | A1 | 10/2010 | Ramankutty | |
| 2010/0281151 | A1 | 11/2010 | Ramankutty et al. | |
| 2010/0299419 | A1 | 11/2010 | Ramankutty et al. | |

FOREIGN PATENT DOCUMENTS

| | | |
|---|---|---|
| WO | WO-02/056622 A1 | 7/2002 |
| WO | WO-2009/150499 A1 | 12/2009 |

OTHER PUBLICATIONS

3GPP, "3GPP TS 29.303, V8.0.0, Technical Specification", Dec. 2008, retrieved from http://www.arib.or.jp/IMT-2000/V720Mar09/5_Appendix/Rel8/29/29303-800.pdf on Dec. 9, 2010.*
Cisco Systems, "Gateway Load Balancing Protocol Overview", 2004 (25 pages).
International Search Report and Written Opinion issued for PCT/US2010/026239, mailed Jun. 18, 2010 (16 pages).
U.S. Appl. No. 12/984,335, filed Jan. 4, 2011. 43 pages.
U.S. Appl. No. 12/955,080, filed Nov. 29, 2010. 40 pages.

* cited by examiner

*Primary Examiner* — Liangche A Wang
(74) *Attorney, Agent, or Firm* — Wilmer Cutler Pickering Hale and Dorr LLP

(57) ABSTRACT

Systems and methods are provided to allow detection of the load conditions on network devices. The load detection can occur using a mobility management device to track establishment of sessions and attempts at session establishment to determine the loading conditions on various network devices. This information can then be used by a selection logic to determine which devices are selected to send session establishment messaging for new session establishment requests. This can provide quicker setup times as highly loaded network devices or network devices experiences other failures are selected less until conditions are back to normal.

20 Claims, 5 Drawing Sheets

DETECTING OVERLOADS IN NETWORK DEVICES

CROSS-REFERENCE TO RELATED APPLICATIONS

This application claims benefit under 35 U.S.C. §119(e) of U.S. Provisional Patent Application No. 61/157,474, entitled "Detecting Overloads in Network Devices," filed Mar. 4, 2009, which is hereby incorporated by reference herein in its entirety.

FIELD OF THE DISCLOSURE

This disclosure relates to a system and method for detecting overloads in network devices in a communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed, including WiFi, an implementation of various IEEE 802.11 protocols, WiMAX, an implementation of IEEE 802.16, and HiperMAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology.

SUMMARY OF THE DISCLOSURE

Systems and methods are provided to allow detection of the load conditions on network devices. The load detection can occur using a mobility management device to track establishment of sessions and attempts at session establishment to determine the loading conditions on various network devices. This information can then be used by a selection logic to determine which devices are selected to send session establishment messaging for new session establishment requests. This can provide quicker setup times as highly loaded network devices or network devices experiences other failures are selected less until conditions are back to normal.

In some embodiments, a method for dynamically detecting gateway load conditions at a mobility management entity (MME) in a communication network is disclosed that includes a plurality of packet data network gateways (PGWs) and a plurality of serving gateways (SGWs), each of the serving gateways for communicating with the MME and with one or more PGWs. The method further includes sending a plurality of session establishment requests from the MME to a plurality of SGWs, the session establishment requests configured to be further sent from the SGWs to one or more PGWs, receiving a plurality of corresponding session establishment responses from the plurality of SGWs, the responses including information relating to whether a session can be established with a PGW in combination with an SGW, the responses indicating a success or failure in the ability to establish a session with a combined SGW and PGW, from the information relating to success or failure of PGW-SGW combinations, and in response to information relating to a failure, determining whether the failure is at the PGW or the SGW, and identifying any PGW and SGW gateways that are determined to have failed, the method thus determining from information relating to failures of combinations of SGWs and PGWs whether the failure is caused by the PGW, whether the failure is caused by the SGW, or whether the failure is at both the PGW and the SGW.

In certain embodiments, a method for dynamically detecting load conditions from a control node in a communication network is disclosed that includes a plurality of gateways, the method including sending a plurality of session establishment requests from the control node to a plurality of gateways through a plurality of intervening gateways, receiving a plurality of corresponding session establishment responses from the plurality of gateways through the plurality of intervening gateways, storing the corresponding session establishment responses in a data structure at the control node, determining the failure conditions of at least one of the gateways and intervening gateways based on the data structure, including determining from failure information whether the failure condition is at the gateway or the intervening gateway, and identifying any gateways which are determined to be failing, wherein the intervening gateways are configured to forward session establishment requests from the control node to one or more gateways, and are also configured to forward session establishment responses from one or more gateways to the control node.

In yet other embodiments, a mobility management entity (MME) for dynamically detecting load conditions in a communication network is disclosed that includes a plurality of serving gateways (SGWs) and a plurality of packet data gateways (PGWs). The MME includes a physical interface configured to send a plurality of session establishment requests from the MME to a plurality of PGWs through the plurality of SGWs, and to receive a plurality of corresponding session establishment responses from the plurality of PGWs through the plurality of SGWs, a storage medium configured to store the plurality of corresponding session establishment responses in a data structure, and a processing unit, in communication with the storage medium, that is configured to deduce the failure conditions of at least one of the PGWs and SGWs based on the data structure and identify any PGWs and SGWs which are determined to be failing, the processing unit for determining based on success and failure information, whether a failure is at the PGW or SGW when a failure indication indicates that a combination of a SGW and a PGW has failed.

DETAILED DESCRIPTION

Systems and methods of detecting overloads in network devices in communication systems are disclosed in certain embodiments. In some networks, it can be difficult to determine the exact cause of the failure to establish a new call or establish a new data session with the network. Since many network devices may be involved in setting up a call, a mobility management device, such as a mobility management entity (MME), may not be able to detect which network device is overloaded in the network. Since a mobility management device determines which network devices end up handling a call or data session, the mobile management device can benefit from knowing which devices are more heavily loaded than others.

Figure 1:
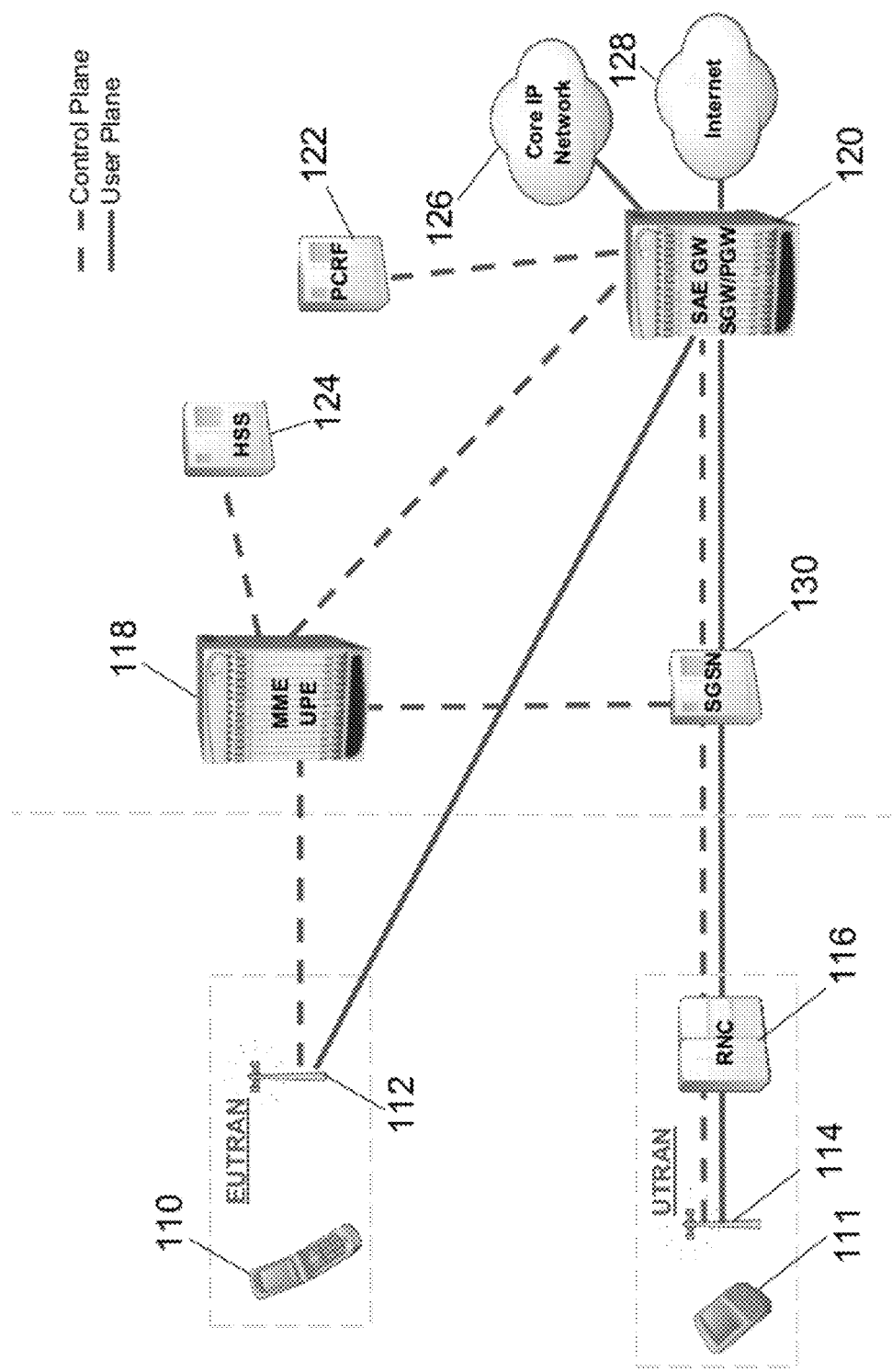
FIG. 1 illustrates a network diagram in accordance with certain embodiments.

FIG. 1 illustrates a network diagram in accordance with certain embodiments. FIG. 1 illustrates both a universal mobile telecommunication system (UMTS) release 8 network and a LTE network. The network diagram of FIG. 1 includes user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, home subscriber server (HSS) 124, core IP network 126, internet 128, and Serving General packet radio service Support Node (SGSN) 130. The MME 118, SAE GW 120, and SGSN 130 can be implemented in a chassis as described below. The SAE GW 120 can include a serving gateway (SGW) as well as a packet data network gateway (P-GW). In some embodiments, the SGW and P-GW can be implemented on separate network devices. The main component of the SAE architecture is the Evolved Packet Core (EPC), also known as SAE Core. The EPC includes the MME, SGW and P-GW components.

MME 118 is a control node for the LTE access network. The MME 118 is responsible for UE 110 tracking and paging procedures including retransmissions. MME 118 handles the bearer activation/deactivation process and is also responsible for choosing the SGW for a UE 110 at the initial attach and at time of an intra-LTE handover. The MME 118 also authenticates the user by interacting with the HSS 124. The MME 118 also generates and allocates temporary identities to UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME also provides the control plane function for mobility between LTE and 2G/3G access networks with the S3 interface terminating at the MME 118 from the SGSN 130. The MME 118 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 110. The SGW manages and stores UE contexts, e.g. parameters of the IP bearer service and network internal routing information. The SGW also performs replication of the user traffic in case of lawful interception. The P-GW provides connectivity to the UE 110 to external packet data networks by being the point of exit and entry of traffic for the UE 110. A UE 110 may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 (CDMA 1X and EvDO).

Figure 2:
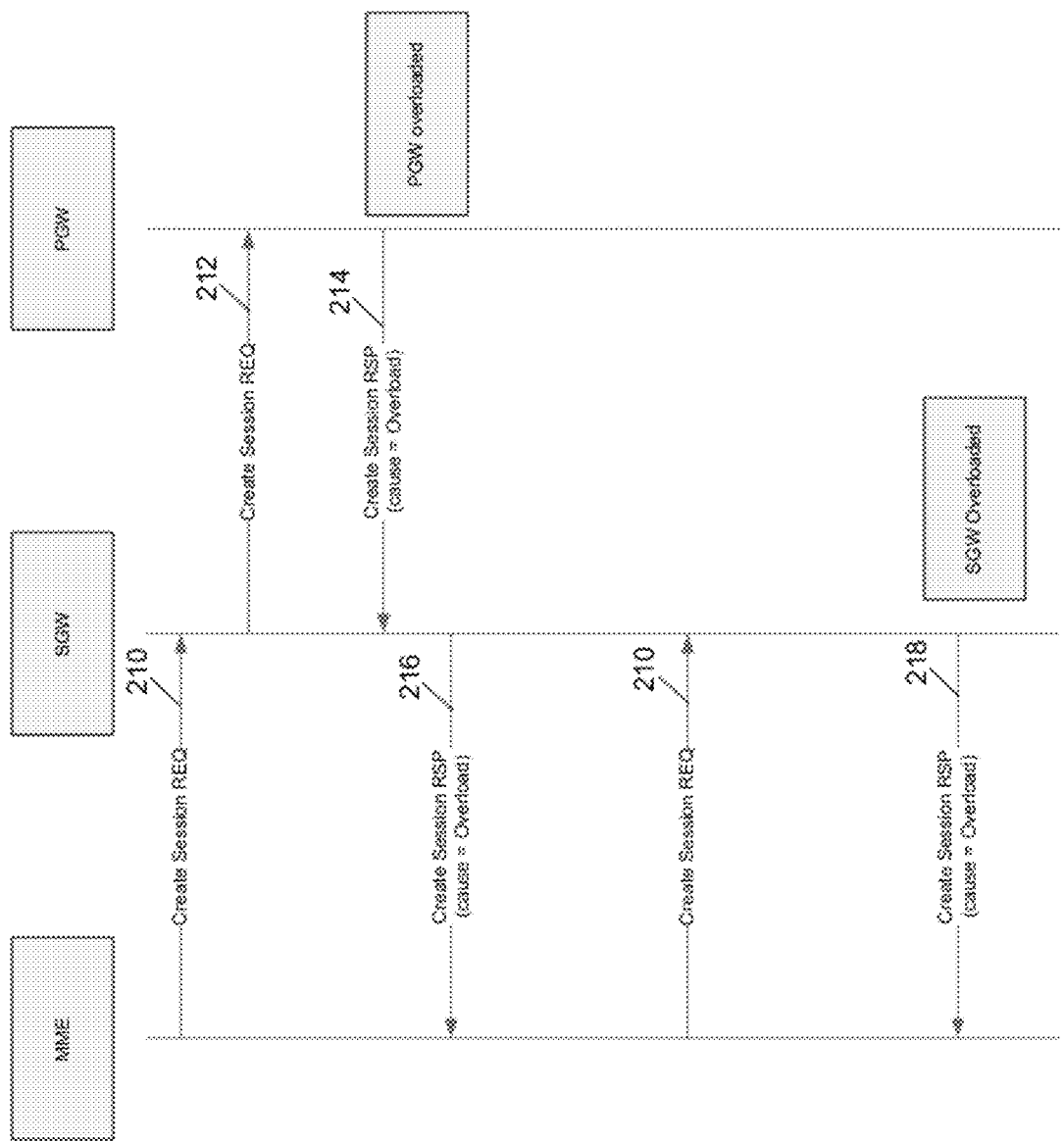
FIGS. 2 and 3 illustrate new session signaling in accordance with certain embodiments.

Currently, it can be difficult to directly determine at an MME whether a SGW or a PGW is overloaded and causing a new call or data session establishment failures. The messaging between the MME and the SGW does not specify the conditions particularly related to the SGW or the PGW. For example, if the SGW is overloaded, the MME will receive an error, but the same error can be received if the PGW is overloaded. FIG. 2 illustrates signaling relating to call or data session establishment in accordance with some embodiments. Evolved General Packet Radio Service (GPRS) Tunneling Protocol for Control plane (GTPv2-C) can be used in the messaging communications between the MME, the SGW, and the PGW. Other protocols such as GTP-C or variants based on GPRS tunneling protocol can also be used. In FIG. 2, the MME sends a create session request 210 message to create a new session to the SGW. The MME can select the SGW and the PGW to use for creating a new session. The new session allows tunnels to be setup and upon establishment of a session data can begin following through the network to the UE. The data can include voice calls, content, or any other type of packet information. The MME uses the tracking area identity (TAI) to resolve to a pool of SGWs and the MME uses access point name (APN) to resolve to a pool of PGWs. The MME can then pick a SGW and a PGW from these pools. The SGW sends a create session request message 212 to the PGW.

The create session request 212 message prompts a create session response 214 message which can include a cause if the session cannot be established at the PGW. The error cause for the failure to establish a session can be such things as "No memory available", "No resources available", etc. The create session response 216 received from the SGW lists the same cause as the PGW and the error cause does not describe where the failure originated. The failure could also be because of a hardware failure and the create session response 216 would not be able to detail where the problem originated. Create session response 218 illustrates the problem in that the responsive messaging does not indicate whether the problem is at the SGW or the PGW.

In some embodiments, the MME can be implemented to deduce the overload conditions of the gateways (e.g., SGW and PGW). The implementation can use a data structure such as a table to record the results of transaction combinations. The data structure can include a time entered to determine how old information results are. Once a certain amount of time has elapsed, an entry can be discarded. The data structure can also overwrite an old entry with a new entry to keep information current. The data structure can be a database or a table of the form below:

| SGW | PGW | Result-Code |
|-----|-----|-------------|
| SGW-1 | PGW-1 | Fail |
| SGW-1 | PGW-2 | Fail |
| SGW-2 | PGW-1 | Fail |
| SGW-2 | PGW-2 | Success |
| SGW-1 | PGW-1 | Fail |
| SGW-1 | PGW-2 | Success |

Figure 3:
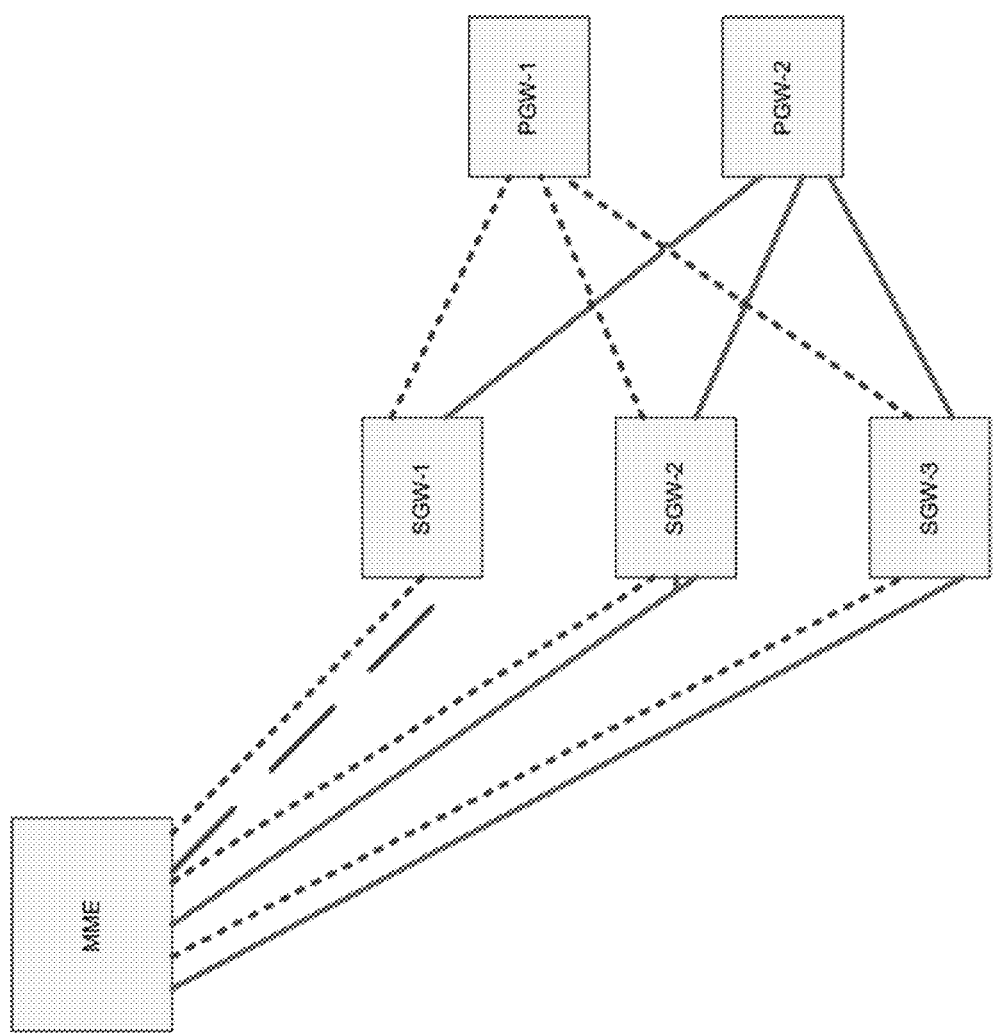

FIG. 3 illustrates session establishment signaling in accordance with certain embodiments. The table above can be created from sending a number of session create requests as shown in FIG. 3 with MME, SGW-1, SGW-2, SGW-3, PGW-1, and PGW-2. By analyzing the data in the data structure, the MME can determine that the responses involving PGW-1 were failing (i.e., trying to reach the PGW-1 via SGW-1, SGW-2 and SGW-3 all failed). This implies that the PGW-1 is overloaded or some other failure has occurred. Some of the requests sent to PGW-2 resulted in successful responses, but the requests sent thru SGW-1 to PGW-2 resulted in failure. This implies that the SGW-2 is overloaded or otherwise incapacitated. This example shows how the information obtained from the session create messaging organized in the data structure allows loading to be determined. Based on the above analysis the MME may mark or otherwise designate PGW-1 and SGW-1 as overloaded.

When a network device is marked as overloaded, the mobility management device can modify distribution of session establishment signaling. This can include sending to a PGW or SGW that is determined to be overloaded. The distribution of signaling can be implemented by the MME assigning a lower weight in a round-robin selection among the similar gateways during the SGW selection and PGW-selection logic. The selection logic can be implemented in any applicable storage device such a computer readable medium. The MME can recompute the overload-detection logic every time it gets a response from the SGW, thus whenever the SGW or PGW is relieved of the overload condition it can be chosen at normal weight (priority).

In some embodiments, this selection logic allows operators to deploy a MME with 3rd party SGWs and PGWs. That is, the MME can communicate within the standard messaging with other gateway devices and determine overload condition to avoid setup delays. Other proprietary methods are possible to solve this problem of detecting an overload condition. This can be accomplished by introducing a new cause-code to specify whether the overload is in the SGW or PGW separately. Additionally, the mobility management device can poll the network devices to receive real-time load information such as the number of session operating on the network device. This can be used to populate a data structure and the selection logic can employ an algorithm that assigns weights to the various network devices to dynamically choose the network devices best suited to handle the call or data session.

Figure 4:
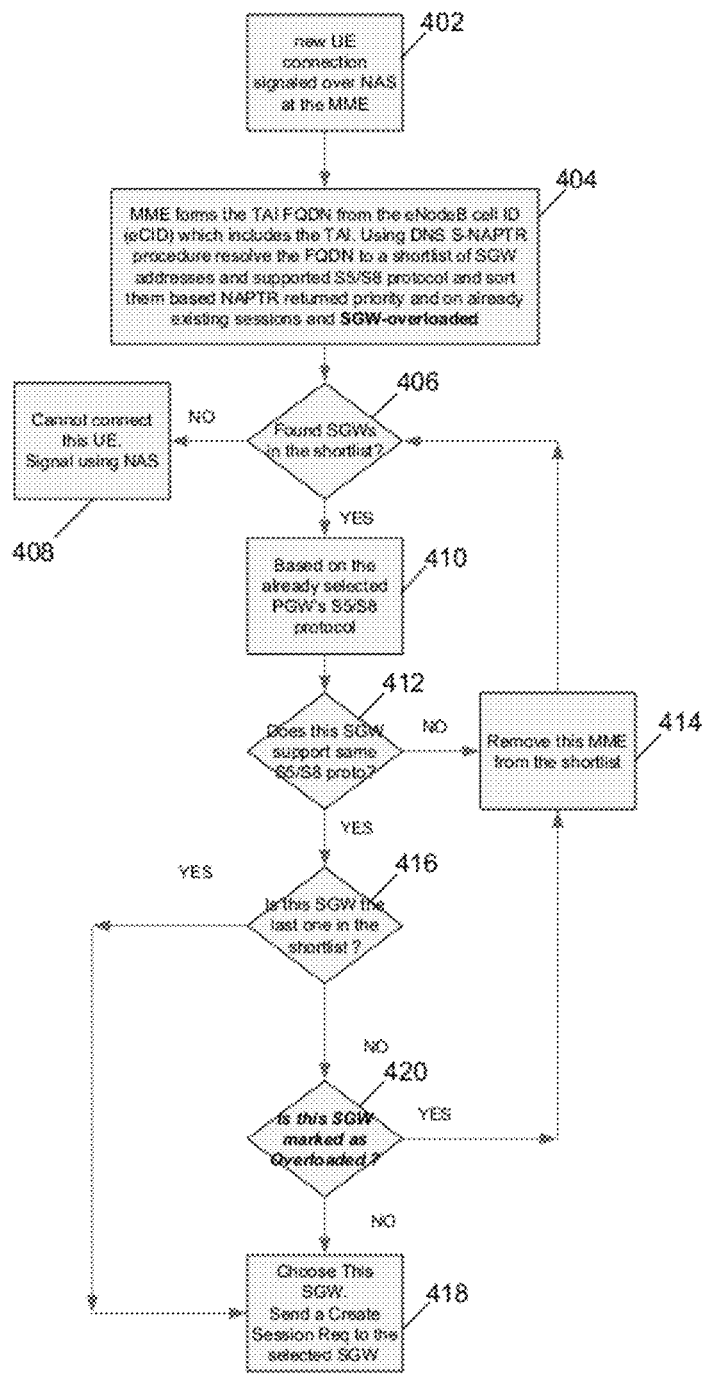
FIG. 4 illustrates a selection logic in accordance with certain embodiments.

FIG. 4 illustrates a selection logic in accordance with certain embodiments. The selection logic can be stored in a computer readable medium that is accessible by a processor on a chassis implementing the MME. In 402, a new UE connection is signaled over the non access stratum (NAS) protocol to the MME. In 404, the MME forms a tracking area identity fully qualified domain name (TAI FQDN) from the eNodeB cell ID (eCID) including the tracking area identity.

Using DNS straightforward-name authority pointer (S-NAPTR) procedure, the MME resolves the FDQN to a shortlist of SGW addresses and supported S5/S8 protocols. These are sorted based on a combination of NAPTR returned priority, on already existing sessions, and overload weighting. The overload weighting can be SGW or PGW loading conditions as represented in the data structure.

In 406, the MME finds SGWs in the shortlist created in 404. If no SGWs are found in the shortlist in 406, this UE cannot connect using NAS and the MME signals the UE that a session cannot be established in 408. If a SGW can be found in 406, a PGW is selected in 410 based on the S5/S8 protocol. In 412, the MME checks whether the SGW supports the same S5/S8 protocol as the PGW. If not in 414, the SGW is removed from the MME shortlist and the process starts over with a modified shortlist in 406. If the SGW does support the same protocol in 412, then the MME checks if the SGW is the last one in the shortlist in 416. If the SGW is the last one in the shortlist in 416, this SGW is chosen in 418 and a create session request is sent to the selected SGW.

If the SGW is not the last one in the shortlist 416, then the MME checks whether the SGW is marked as overloaded in 420. If the SGW is marked as overloaded in 420, this entry can be checked for when the SGW was marked and the number of times the SGW has been selected from the shortlist. If the time meets a threshold or a threshold number of tries have been passed up, this SGW is chosen and the new result is written into the data structure. For example, if the attempt is successful then the SGW is unmarked. If the attempt is unsuccessful, then the entry is rewritten as being unsuccessful resetting the time and number of attempts. If the threshold is not met in 420 and the SGW is marked as overloaded, then this is removed from the shortlist in 414. The PGW can go through the same overloaded check in the selection logic to determine the PGW selected.

The chassis described above can implement multiple and different integrated functionalities. In some embodiments, a mobility management entity (MME), a serving gateway (SGW), a PDN gateway (P-GW), an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an inter-rogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

Figure 5:
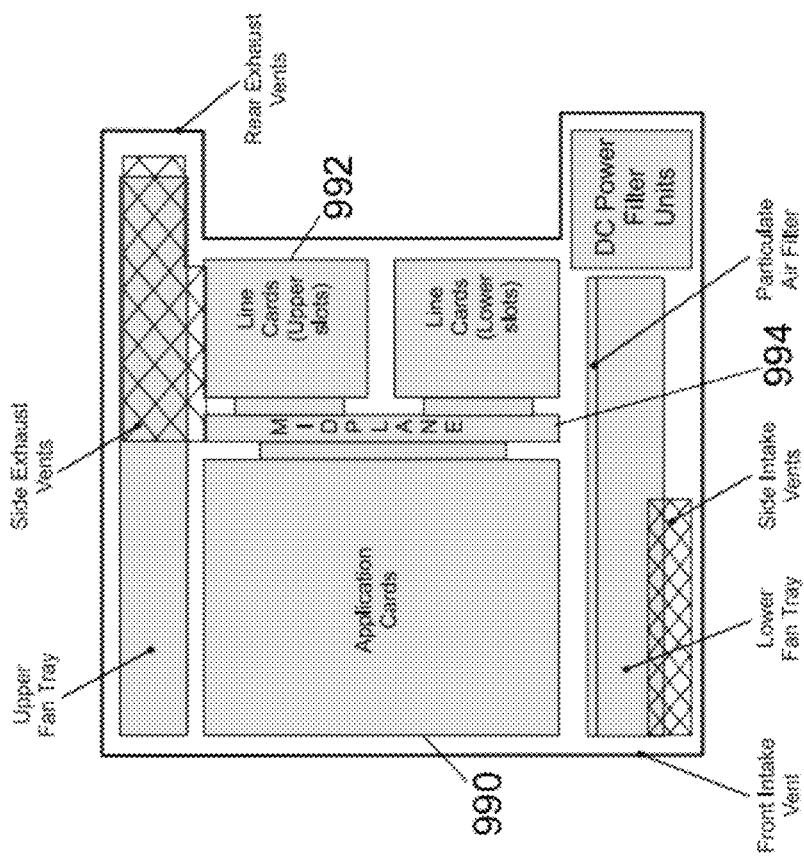
FIG. 5 illustrates a chassis in accordance with certain embodiments.

The features of a chassis that implements a gateway, in accordance with some embodiments, are further described below. FIG. 5 illustrates positioning of cards in the chassis in accordance with some embodiments. The chassis includes slots for loading application cards 990 and line cards 992. A midplane 994 can be used in the chassis to provide intra-chassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides multithreaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A method for dynamically detecting gateway load conditions at a mobility management entity (MME) in a communication network including a plurality of packet data network gateways (PGWs) and a plurality of serving gateways (SGWs), each of the serving gateways for communicating with the MME and with one or more PGWs, the method comprising:
   sending, by the MME, a first session establishment request from the MME to a first SGW, the first session establishment request configured to be further sent from the first SGW to a first PGW;
   sending, by the MME, a second session establishment request from the MME to the first SGW, the second session establishment request configured to be further sent from the first SGW to a second PGW;
   sending, by the MME, a third session establishment request from the MME to a second SGW, the third session establishment request configured to be further sent from the second SGW to the first PGW;
   sending, by the MME, a fourth session establishment request from the MME to the second SGW, the fourth session establishment request configured to be further sent from the second SGW to the second PGW;
   receiving a plurality of corresponding session establishment responses from one of the first SGW and the second SGW, the responses including information relating to whether a session can be established with a PGW in combination with an SGW, the responses providing information relating to a failure in the ability to establish a session with a combined SGW and PGW; and
   from rules relating to success or failure of PGW-SGW combinations, and in response to the information relating to a failure of at least one PGW-SGW combination, determining whether the failure is at the PGW or the SGW,
   the method thus determining from information relating to failures of combinations of SGWs and PGWs whether the failure is located at a PGW, whether the failure is located at a SGW, or whether the failure is at both a PGW and a SGW.

2. The method of claim 1, further comprising the MME selecting an SGW for a new session based on the determined failure conditions of the SGWs and the determined failure conditions of the PGWs.

3. The method of claim 2, wherein if a MME determines a failure of a given SGW or PGW, the failed SGW or PGW is not selected by the MME for establishment of a new session, and is removed from a list of available resources at the MME designated for use by new sessions.

4. The method of claim 1, wherein a failure indication is caused by an overloaded gateway.

5. The method of claim 1, wherein sending and receiving messages at the MME is done using the General Packet Radio Service (GPRS) Tunneling Protocol for Control Plane (GTPv2-C) protocol.

6. The method of claim 1, further comprising storing the session establishment responses in a data structure at the MME, where the data structure includes information about age of session establishment response information, and session establishment response information is discarded once the age exceeds a specified threshold.

7. A method for dynamically detecting load conditions from a control node in a communication network including a plurality of intervening gateways, the method comprising:
   sending, by the MME, a first session establishment request from the MME to a first SGW, the first session establishment request configured to be further sent from the first SGW to a first PGW;
   sending, by the MME, a second session establishment request from the MME to the first SGW, the second session establishment request configured to be further sent from the first SGW to the second PGW;
   sending, by the MME, a third session establishment request from the MME to a second SGW, the third session establishment request configured to be further sent from the second SGW to the first PGW;
   sending, by the MME, a fourth session establishment request from the MME to the second SGW, the fourth session establishment request configured to be further sent from the second SGW to the second PGW;
   receiving a plurality of corresponding session establishment responses from one of the first SGW and the second SGW;
   storing the session establishment response in a data structure at the control node; and
   determining the failure conditions of at least one of the gateways and intervening gateways based on the data structure, including determining from failure information for at least one combination of a gateway and an intervening gateway, whether the failure condition is at the gateway or the intervening gateway,
   wherein the intervening gateways are configured to forward session establishment requests from the control node to one or more gateways, and are also configured to forward session establishment responses from one or more gateways to the control node.

8. The method of claim 7, wherein the plurality of gateways include a serving gateway (SGW) and the intervening gateways include a packet data network gateway (P-GW).

9. The method of claim 7, wherein if the control node determines a failure of a given gateway, the failed gateway is not selected by the control node for establishment of a new session, and is removed from a list of available resources designated for use by new sessions, the list being maintained at the control node.

10. The method of claim 7, wherein evaluation of success or failure of a given gateway comprises sending a plurality of session establishment requests to the gateway through at least two intervening gateways and receiving the corresponding session establishment responses at the control node, where each of the corresponding session establishment responses contains a failure result code.

11. The method of claim 7, wherein evaluation of success or failure of a given intervening gateway comprises sending at least two session establishment requests through the intervening gateway to another gateway and receiving the corresponding session establishment responses at the control node, where each of the corresponding session establishment responses contains a failure result code.

12. The method of claim 7, wherein a failure indication of a gateway indicates the overloading of the gateway.

13. The method of claim 7, wherein the data structure includes a table with information about age of session establishment response information stored in the data structure, and session establishment response information is discarded once the age exceeds a specified threshold.

14. A mobility management entity (MME) for dynamically detecting load conditions in a communication network including a plurality of serving gateways (SGWs) and a plurality of packet data gateways (PGWs), the MME comprising:
  a physical interface configured to send a first session establishment request from the MME to a first SGW, the first session establishment request configured to be further sent from the first SGW to a first PGW,
  and configured to send a second session establishment request from the MME to a second SGW, the second session establishment request configured to be further sent from the second SGW to the first PGW,
  and configured to send a second session establishment request from the MME to the first SGW, the second session establishment request configured to be further sent from the first SGW to a second PGW;
  and configured to send a third session establishment request from the MME to a second SGW, the third session establishment request configured to be further sent from the second SGW to the first PGW;
  and configured to send a fourth session establishment request from the MME to the second SGW, the fourth session establishment request configured to be further sent from the second SGW to the second PGW;
  and to receive a plurality of corresponding session establishment responses from one of the first SGW and the second SGW;
  a storage medium configured to store a plurality of corresponding session establishment responses in a data structure for at least one combination of a PGW and a SGW; and
  a processing unit in communication with the storage medium, the processing unit configured to deduce failure conditions of at least one of the PGWs and SGWs based on the data structure and identify any PGWs and SGWs determined to be failing,
  the processing unit for determining, based on success and failure information, whether a failure is at the PGW or SGW when a failure indication indicates that a combination of a SGW and a PGW has failed.

15. The MME of claim 14, wherein the MME subsequently selects a SGW for a new session based on the determined failure conditions of the SGWs and the determined failure conditions of the PGWs.

16. The MME of claim 14, wherein the MME determines the failure of a PGW when the MME sends a plurality of session establishment requests to the PGW through at least two SGWs, the MME receives the corresponding session establishment responses, and each of the corresponding session establishment responses contains a failure result code.

17. The MME of claim 14, wherein the MME determines the failure of an SGW when the MME sends at least two session establishment requests through the SGW to a PGW, the MME receives the corresponding session establishment responses, and each of the corresponding session establishment responses contains a failure result code.

18. The MME of claim 14, wherein failure of a gateway is defined to include being overloaded.

19. The MME of claim 14, wherein the MME sends and receives messages using the General Packet Radio Service (GPRS) Tunneling Protocol for Control Plane (GTPv2-C) protocol.

20. The MME of claim 14, wherein the data structure includes a table with information about age of session establishment response information stored in the data structure, and session establishment response information is discarded once the age exceeds a specified threshold.

* * * * *